US011739699B2

(12) United States Patent
Drolet et al.

(10) Patent No.: US 11,739,699 B2
(45) Date of Patent: Aug. 29, 2023

(54) METHOD OF CONTROLLING THE GEOMETRICAL CONFIGURATION OF A VARIABLE GEOMETRY ELEMENT IN A GAS TURBINE ENGINE COMPRESSOR STAGE

(71) Applicant: PRATT & WHITNEY CANADA CORP., Longueuil (CA)

(72) Inventors: Martin Drolet, Saint-Amable (CA); Yves Cloutier, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/521,352

(22) Filed: Nov. 8, 2021

(65) Prior Publication Data

US 2023/0143026 A1 May 11, 2023

(51) Int. Cl.
*F02C 9/18* (2006.01)
*F02C 9/20* (2006.01)
*F02C 9/22* (2006.01)

(52) U.S. Cl.
CPC .............. *F02C 9/22* (2013.01); *F02C 9/18* (2013.01); *F02C 9/20* (2013.01); *F05D 2200/13* (2013.01); *F05D 2200/14* (2013.01); *F05D 2200/211* (2013.01); *F05D 2220/323* (2013.01); *F05D 2270/303* (2013.01); *F05D 2270/3015* (2013.01); *F05D 2270/3061* (2013.01); *F05D 2270/335* (2013.01); *F05D 2270/71* (2013.01)

(58) Field of Classification Search
CPC ........... F05D 2270/71; F05D 2270/306; F05D 2270/3061
See application file for complete search history.

(56) References Cited

U.S. PATENT DOCUMENTS

| | | | | |
|---|---|---|---|---|
| 4,309,871 | A * | 1/1982 | Venema | F04D 27/0261 417/43 |
| 4,448,019 | A * | 5/1984 | Klees | F02K 3/02 60/262 |
| 5,042,245 | A * | 8/1991 | Zickwolf, Jr. | F04D 27/0261 60/773 |
| 5,385,012 | A * | 1/1995 | Rowe | F04D 27/0215 60/779 |
| 6,364,602 | B1 | 4/2002 | Andrew et al. | |
| 7,762,084 | B2 | 7/2010 | Martis et al. | |
| 8,459,038 | B1 * | 6/2013 | Lickfold | F02K 3/025 60/773 |
| 9,556,798 | B2 | 1/2017 | Ekanayake et al. | |
| 10,677,251 | B2 * | 6/2020 | Barkowsky | F02C 7/32 |
| 11,008,948 | B2 * | 5/2021 | DeRoy | B64D 13/06 |
| 11,149,654 | B2 * | 10/2021 | Muthaiah | F02C 9/28 |
| 2014/0093350 | A1 * | 4/2014 | Meisner | F01D 17/08 415/17 |

(Continued)

*Primary Examiner* — Alain Chau
(74) *Attorney, Agent, or Firm* — Norton Rose Fulbright Canada LLP

(57) ABSTRACT

The method can include determining a mass flow rate W of working fluid circulating through the compressor stage, determining a control parameter value associated to the geometrical configuration of the variable geometry element based on the determined value of mass flow rate W; and changing the geometrical configuration of the variable geometry element in accordance with the determined control parameter value.

18 Claims, 13 Drawing Sheets

(56) References Cited

U.S. PATENT DOCUMENTS

| | | | |
|---|---|---|---|
| 2018/0163734 A1* | 6/2018 | Barkowsky | F04D 27/0223 |
| 2019/0264701 A1 | 8/2019 | Rowe | |
| 2020/0088107 A1* | 3/2020 | DeRoy | F02C 9/18 |
| 2021/0040900 A1* | 2/2021 | Panov | F02C 9/28 |
| 2021/0164402 A1* | 6/2021 | Pachidis | F04D 27/001 |
| 2021/0277833 A1* | 9/2021 | Muthaiah | G05B 23/0254 |
| 2021/0285386 A1 | 9/2021 | Cloutier | |

* cited by examiner

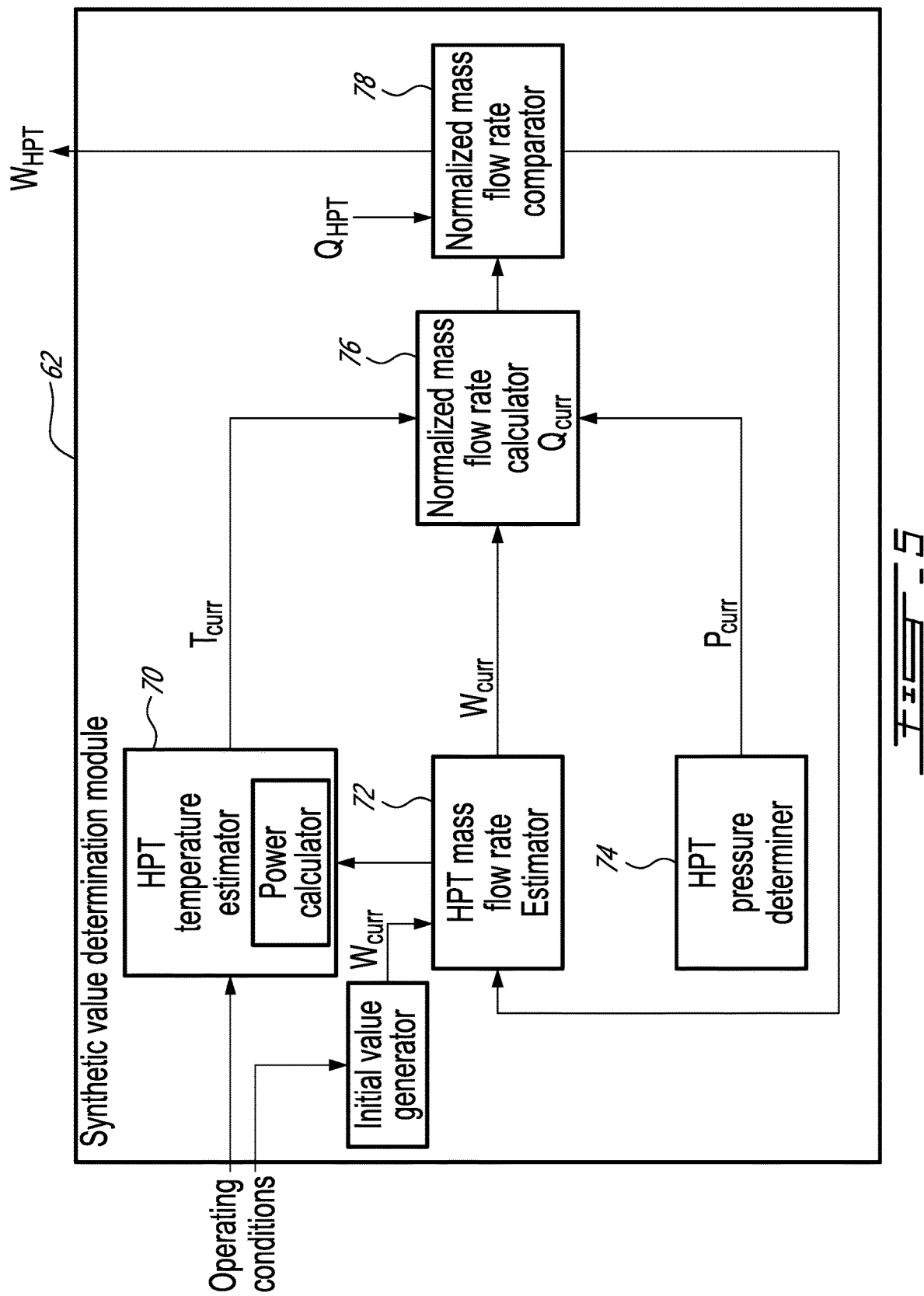

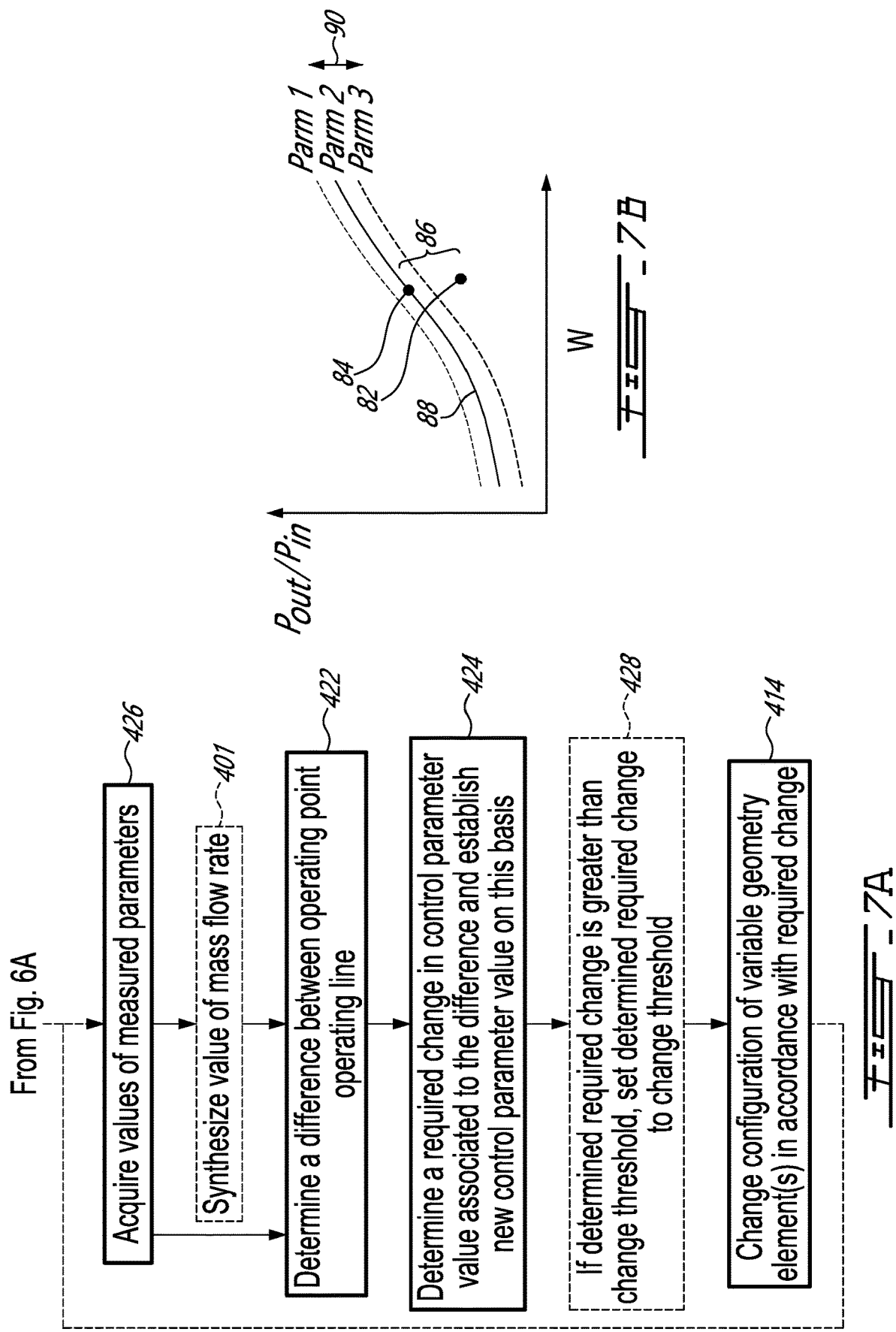

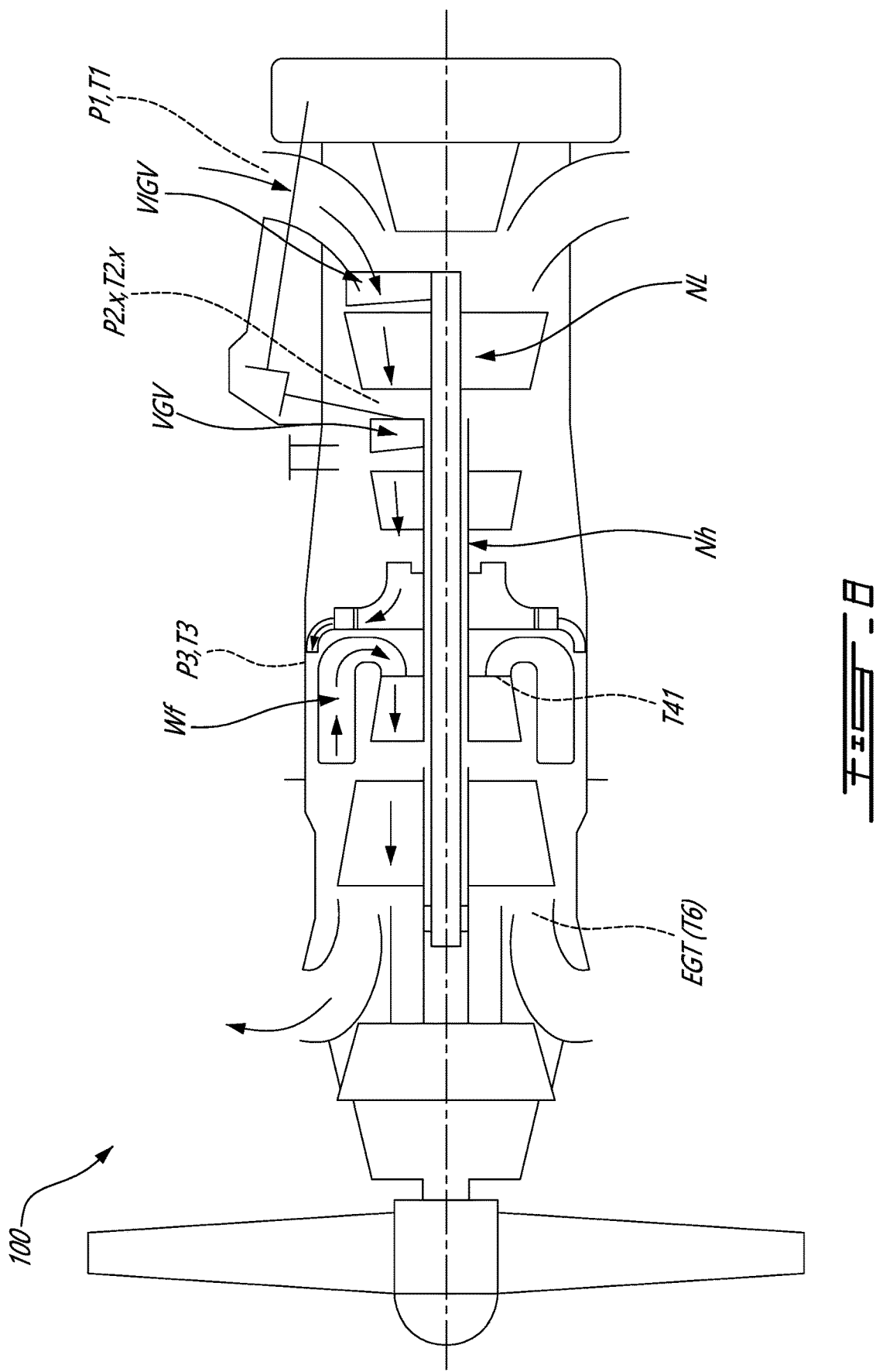

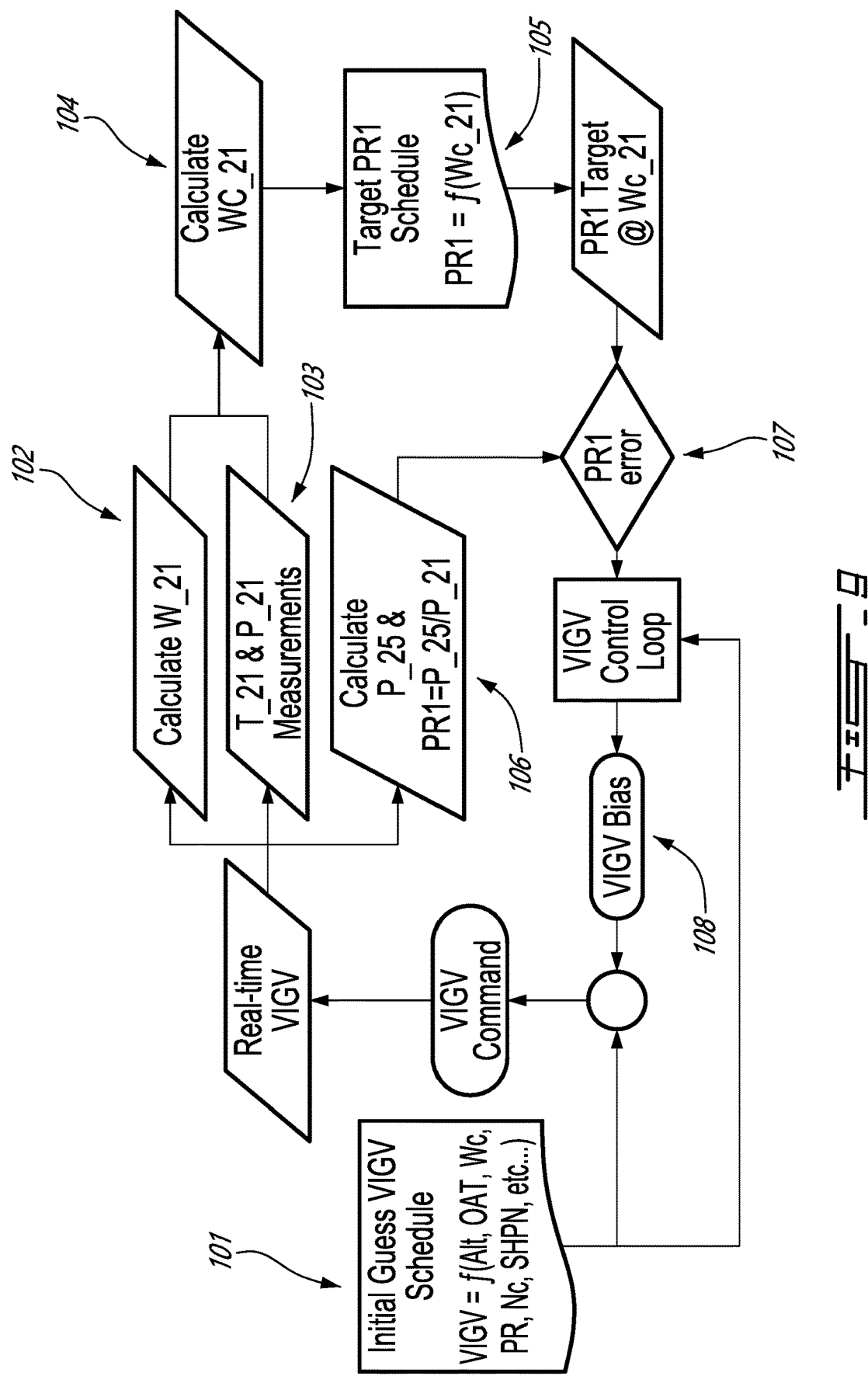

METHOD OF CONTROLLING THE GEOMETRICAL CONFIGURATION OF A VARIABLE GEOMETRY ELEMENT IN A GAS TURBINE ENGINE COMPRESSOR STAGE

TECHNICAL FIELD

The application relates generally to variable geometry elements in aircraft gas turbine engine compressors and, more particularly, to control methods therefore.

BACKGROUND OF THE ART

One of the significant areas of focus in compressor design is optimizing compressor performance/efficiency and avoiding undesired aerodynamic behaviors such as surge or stall. In many situations, these areas of focus can come into conflict and some level of performance may need to be sacrificed in order to avoid a risk of undesired aerodynamic behavior. Limiting the amount of performance which is sacrificed in this manner can be a constant concern, and can be a particular challenge in engines having more than one compressor stage and operating across a large operating envelope since choking may occur on different compressor stages at different rotor speeds and, by limiting the mass flow along the main gas path, affect the operating conditions of all other compressor stages.

Variable geometry elements have been introduced in a manner to allow changing the geometry of one or more compressor stages as a function of evolving conditions. Even though the control of variable geometry elements in gas turbine engines was satisfactory to a certain degree, there remained room for improvement. Indeed, the process of associating varying values of the variable geometry element to monitored values representing operating conditions could be subject to control inaccuracy which was compensated by safety margins at the cost of a loss in performance in one or more operating condition. There remained room for increasing control accuracy.

SUMMARY

In one aspect, there is provided a method of controlling the geometrical configuration of a variable geometry element of a compressor stage of a gas turbine engine, the method comprising: determining a mass flow rate W of working fluid circulating through the compressor stage, including determining whether a difference between an expected value of normalized mass flow rate $Q_{HPT}$ through a high-pressure turbine (HPT) of the gas turbine engine and an actual value of normalized mass flow rate $Q_{curr}$ through the high-pressure turbine exceeds a threshold value, wherein the actual value of normalized mass flow rate $Q_{curr}$ is related to a current value of mass flow rate $W_{current}$, a current value of pressure $P_{current}$, and a current value of temperature $T_{current}$ through the high-pressure turbine based on the relationship $W_{curr}$:

$$\sqrt{T_{curr}}/P_{curr} = Q_{curr},$$

wherein the difference is expected to be below the given threshold when the high-pressure turbine operates in a choked condition; contingent upon the difference exceeding the threshold value, correcting the value of $W_{curr}$; and outputting the value of $W_{curr}$ as a determined value of mass flow rate W; determining a control parameter value associated to the geometrical configuration of the variable geometry element based on the determined value of mass flow rate W; and changing the geometrical configuration of the variable geometry element in accordance with the determined control parameter value.

In another aspect, there is provided a computer program product stored in a non-transitory computer readable memory and comprising instructions operative to, when executed by a processor, perform a method of determining a mass flow rate W of working fluid circulating through the compressor stage, including determining whether a difference between an expected value of normalized mass flow rate $Q_{HPT}$ through a high-pressure turbine of the gas turbine engine and an actual value of normalized mass flow rate $Q_{curr}$ through the high-pressure turbine exceeds a threshold value, wherein the actual value of normalized mass flow rate $Q_{curr}$ is related to a current value of mass flow rate $W_{curr}$, a current value of pressure $P_{curr}$, and a current value of temperature $T_{curr}$ through the high-pressure turbine based on the relationship $W_{curr}$:

$$\sqrt{T_{curr}}/P_{curr} = Q_{curr},$$

where difference is expected to be below the given threshold when the high-pressure turbine operates in a choked condition; if the difference exceeds the threshold value, updating the value of $W_{curr}$, and returning to the step of determining whether the difference exceeds the threshold value on the basis of the updated value of $W_{curr}$; and if the difference does not exceed the threshold value, outputting the value of $W_{curr}$ as a determined value of mass flow rate W; and determining a control parameter value associated to the geometry of the variable geometry element based on the determined value of mass flow rate W.

In a further aspect, there is provided a gas turbine engine comprising a combustor, a high-pressure turbine and a compressor stage having a variable geometry element and an engine controller having a processor and a memory, the memory having stored thereon instructions executable by the processor to determine a mass flow rate W of working fluid circulating through the compressor stage, including determining whether a difference between an expected value of normalized mass flow rate $Q_{HPT}$ through a high-pressure turbine of the gas turbine engine and an actual value of normalized mass flow rate $Q_{curr}$ through the high-pressure turbine exceeds a threshold value, wherein the actual value of normalized mass flow rate $Q_{curr}$ is related to a current value of mass flow rate $W_{curr}$, a current value of pressure $P_{curr}$, and a current value of temperature $T_{curr}$ through the high-pressure turbine based on the relationship $W_{curr}$:

$$\sqrt{T_{curr}}/P_{curr} = Q_{curr}$$

where the difference is expected to be below the given threshold when the high-pressure turbine operates in a choked condition; if the difference exceeds the threshold value, updating the value of $W_{curr}$, and returning to the step of determining whether the difference exceeds the threshold value on the basis of the updated value of $W_{curr}$; and if the difference does not exceed the threshold value, outputting the value of $W_{curr}$ as a determined value of mass flow rate W; determine a control parameter value associated to the geometry of the variable geometry element based on the determined value of mass flow rate W; and generate control instructions configured to change the geometry of the variable geometry element in accordance with the determined control parameter value.

DESCRIPTION OF THE DRAWINGS

Reference is now made to the accompanying figures in which:

FIG. 5 is a block diagram representing functionalities of a synthetic value determination module in accordance with an embodiment;

FIG. 7A is a flow chart representing a control method in accordance with a relative value control scheme, with FIG. 7B being a graphical representation thereof;

FIG. 8 is a schematic cross-sectional view of a gas turbine engine showing a plurality of measurement points in accordance with an embodiment;

FIG. 9 is a graphical representation of logic to control a low spool compressor variable guide vane geometry on a constant operating line, in accordance with an embodiment;

DETAILED DESCRIPTION

Figure 1:
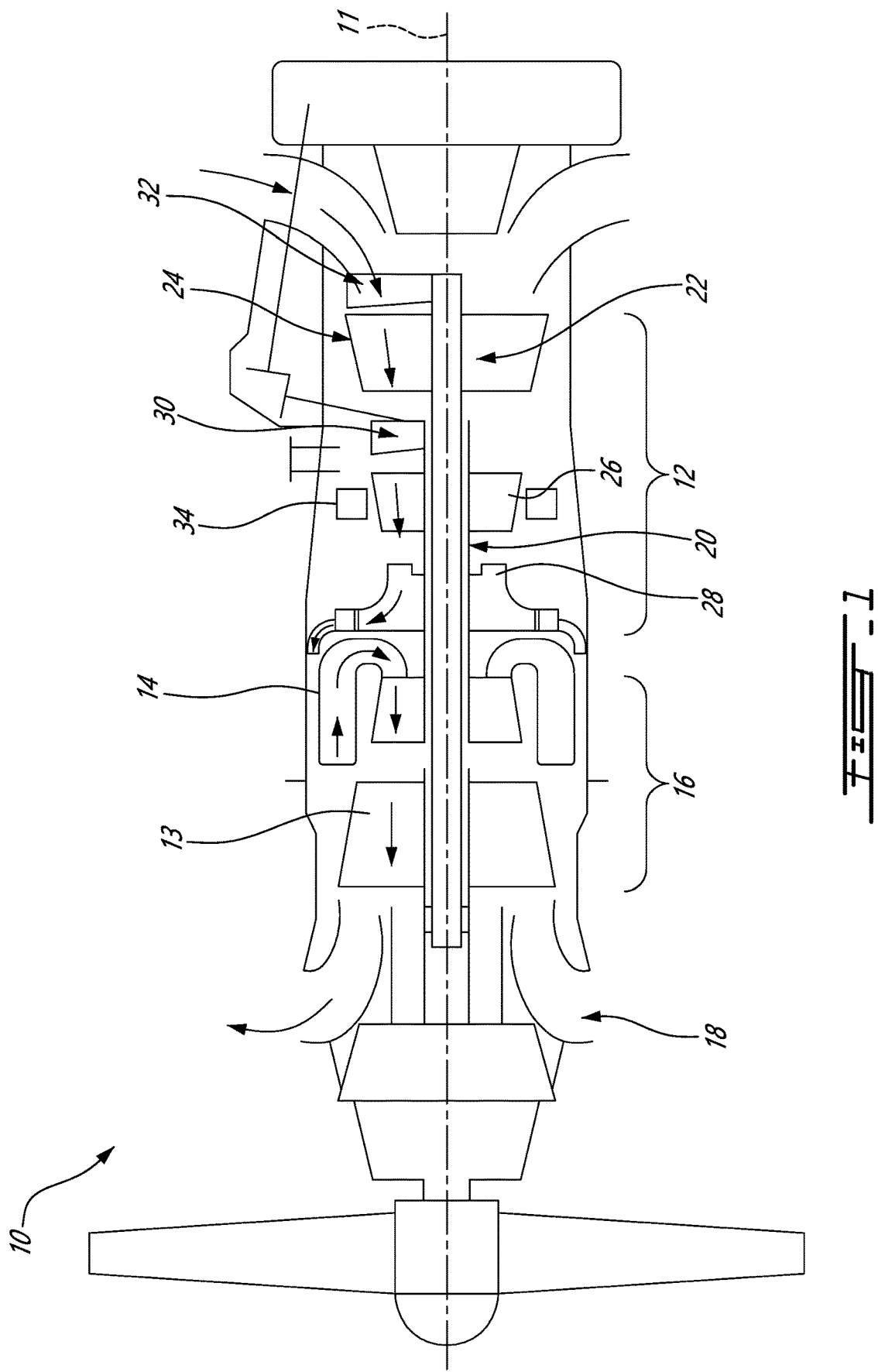
FIG. 1 is a schematic cross-sectional view of a gas turbine engine.

FIG. 1 illustrates an example of a turbine engine. In this example, the turbine engine 10 is a turboprop engine generally comprising in serial flow communication along a main gas path 13, a compressor section 12 for pressurizing the air, a combustor section 14 in which the compressed air is mixed with fuel and ignited for generating an annular stream of hot combustion gases around the engine axis 11, and a turbine section 16 for extracting energy from the combustion gases. The turbine engine 10 terminates in an exhaust section.

In the embodiment shown in FIG. 1, the turboprop engine 10 has multiple compressor and turbine stages, including a high pressure stage associated to a high pressure shaft 20, and a low pressure stage associated to a low pressure shaft 22. The low pressure shaft 22 is used as a power source during use.

In this specific embodiment, the low pressure stage has a single, axial, compressor stage 24, whereas the high pressure stage has a sequence of an axial compressor stage 26 followed by a centrifugal compressor stage 28. Different engines use different numbers and configurations of compressor stages, and the exact configuration can be selected as a function of their intended end use at the design stage. For convenience herein, the expression high pressure turbine stage will be used to refer to the turbine stage which is closest to the combustor along the main gas path, even if an alternate embodiment has a single turbine stage.

Each axial compressor stage has a rotor followed by a stator (not shown) as known in the art. Moreover, in this embodiment, each axial compressor stage further has a corresponding set of variable guide vanes 30, 32 upstream of the rotor. The variable guide vanes, like stator vanes, includes a set of airfoil shaped vanes which have a length extending across a corresponding portion of the annular gas path. In a compressor stage which is perfectly axially oriented (relative the engine axis 11), the length of the variable guide vanes can extend radially, but in practice, the actual orientation can depend on the orientation of the gas path. If the gas path extends or slopes obliquely, the vanes can extend obliquely as well for instance, as in many cases, the optimal orientation of the vanes will be at least roughly transversal to the orientation of the gas path. The vanes of a set of variable guide vanes are circumferentially interspaced from one another around the engine axis 11. However, unlike the stator vanes, the variable guide vanes 30, 32 are configured in a manner to have a variable angle of attack, and to this end are configured to rotate individually and collectively around their individual axes, in a manner to control the swirl angle of the air entering the corresponding rotor. Indeed, compressor functionality can be significantly sensitive to the swirl angle at which the rotor blades receive the incoming air. In alternate embodiments, only one compressor stage may have variable guide vanes, or variable guide vanes may be entirely omitted.

In this embodiment, one axial compressor stage 26 has a bleed valve 34. The bleed valve 34 can be mounted to the outer wall of the gas path, and can be opened at varying degrees of opening between 0% (fully closed) and 100% (fully open), to allow a corresponding flow rate of air to escape the compressor stage in a manner to control pressure therein as a function of varying operating conditions. In alternate embodiments, the bleed valve can be switchable strictly between fully closed and fully open, as opposed to partially openable, though such a scenario may be less common. In alternate embodiments, more than one compressor stage may have a bleed valve, and in still other embodiments, bleed valves may be omitted from the entire engine.

Variable guide vanes 32, 30 and bleed valves 34 are two examples of variable geometry elements which can be introduced in one or more compressor stages 24, 26, 28 with an aim of changing the configuration of the compressor stage to adapt to changing operating conditions in a manner to promote greater efficiency while respecting any required safety margin from points of operation representing potentially undesired aerodynamic behaviors. Other embodiments may have other variable geometry elements than variable guide vanes and bleed valves, and in embodiments where more than one variable geometry element is used, different combinations of variable geometry element types can be used depending on the intended use of the engine.

Compressor Stage Design

In an example process of optimizing compressor stage design, data can be collected by computer assisted simulation, uninstalled engine testing, and/or in-flight aircraft testing to provide a representation of operating conditions which may be expected during operation of the gas turbine engine, and compressor parameters can be determined in a manner to achieve operability and efficiency across the operating envelope. It will be understood that the data used as a basis of compressor stage design only imperfectly matches the actual operating conditions across the operating envelope, and may not account for factors such as variations of engine configuration stemming from variability in production processes or wear which may occur over time for instance, and therefore, a safety margin can be included in the designed parameters to accommodate for any eventual discrepancy between actual operating conditions and expected operating conditions. Such as safety margin typically represents a sacrifice in terms of efficiency and an undesired necessity which should be minimized while respecting other requirements.

In modern engines, variable geometry elements can be introduced to reduce the extent of the performance sacrifice made in at least some areas of the operating envelope. Variable geometry elements can include bleed valves, which are used to evacuate compressed air, and thus pressure, from a given compressor stage, and variable guide vanes, which are used to control the swirl angle of the air immediately upstream of the compressor rotor as a function of the operating conditions, in a manner to continuously optimize the compressor stage efficiency, to name two typical examples.

In the control of variable geometry elements, the concept of operating line has been introduced and represents a selection of points of operation of a given compressor stage as a function of various parameters representing the varying conditions of operation across the operating envelope. An example operating line 40 represented in terms of a relationship between operating parameters of a gas turbine engine is presented in FIG. 2. The points of operation corresponding to the operating line 40 can represent, in each corresponding condition of operation, the highest achievable compressor efficiency while respecting any required safety margin 44 with a point of potential undesired aerodynamic behavior. The limit beyond which potential undesired aerodynamic behavior can include a surge line 42 also defined in terms of a relationship between operating parameters of the gas turbine engine. The safety margin 44 can correspond to the difference between the operating line 40 and the surge line 42. One or more variable geometry element 46 can be controlled, in real time, such as during flight, in a manner to maintain the operation of the compressor stage as close as possible to the operating line 40.

Figure 3:
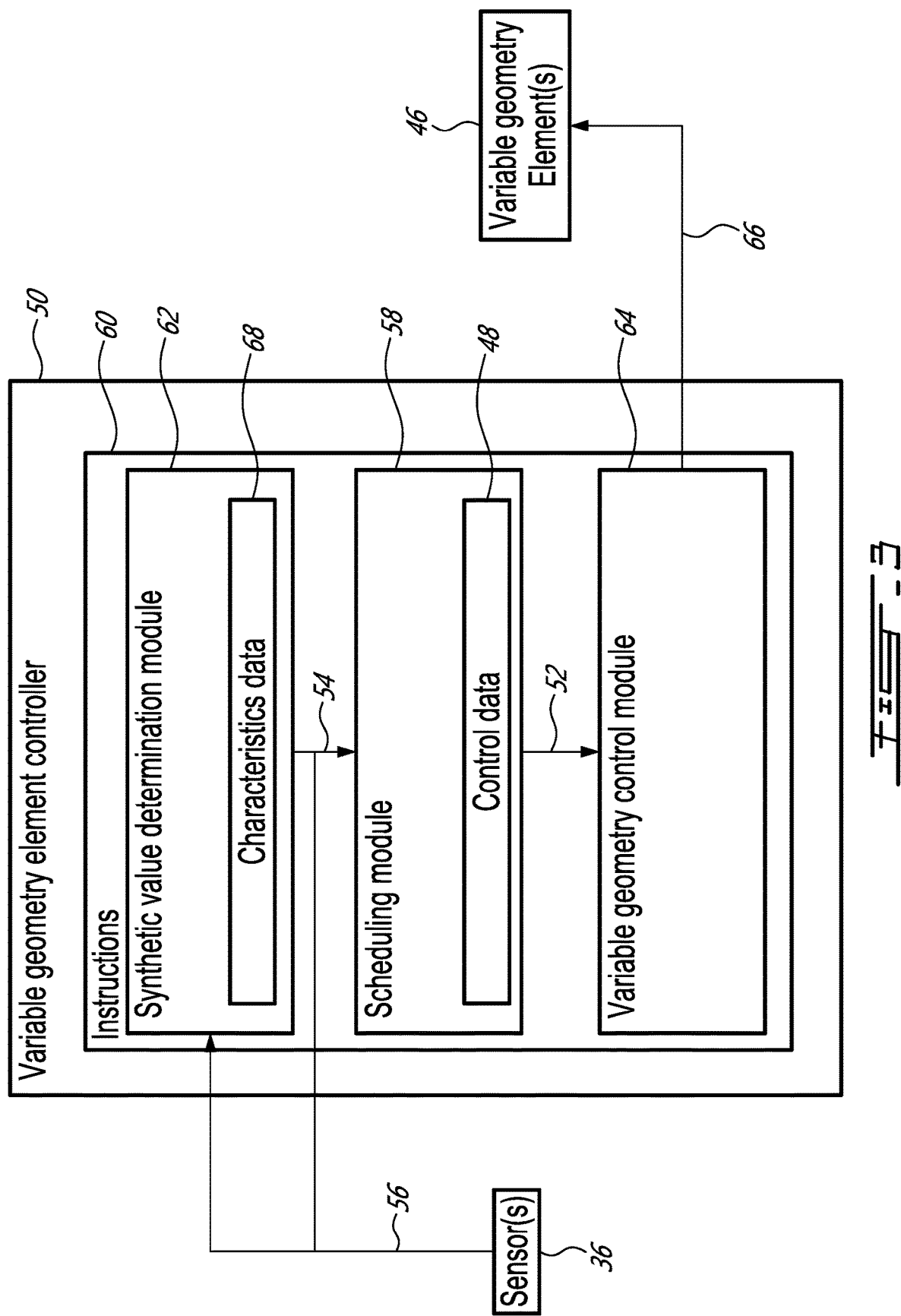
FIG. 3 is a block diagram representing functionalities of a variable geometry element controller in accordance with an embodiment.

Referring now to FIG. 3, it will be noted that in practice, the control of variable geometry elements 46 can be performed using relatively complex sets of computer readable instructions including control data 48, and which can include "schedules", which can be used as a basis for defining relationships between various values of operating parameters. For instance, the control data can be used to match values of control parameters associated to different possible geometries of the variable geometry element(s) with different sets of monitored parameters, the latter being acquired in real time during operation of the engine using sensors, reference data, instructions, and calculation. Accordingly, a controller 50 of the variable geometry element(s) 46, which can be integrated as functionalities of the engine controller or embodied separately therefrom, can continuously determine actualized control parameter values 52 corresponding to continuously changing monitored parameter values 54, and continuously adjust the configuration of the variable geometry elements 46 to match the actualized control parameter values 52.

In practice however, not only may the operating line 40 have been designed based on good, though imperfect data, but the sensors 36 which are integrated to the engine may only provide an imperfect representation of the actual operating conditions which the operating line 40 was designed to fit into, which can impose limitations in terms of which operating parameters can form the basis of the relationship defined by the operating line. Indeed, in many cases, the context of an aircraft engine imposed limits on the possibility of sensing some parameters, either by limiting the degree of accuracy achievable in the measurement of a given monitored parameter or by the measurement of a given monitored parameter simply not being available in a feasible manner. Accordingly, the operating line definition can inherently have inaccuracies stemming from the limitations in the data used to determine it. Moreover, the operating line definition can further have inaccuracies stemming from the constraints associated to the imperfect representation of actual operating conditions due to sensor limitations. This second layer of inaccuracy introduced by the sensor limitations is associated to a second layer of safety margin requirement, which stacks onto to a layer of safety margin requirements associated with limitations in the data available when designing the operating line 40.

Variable Geometry Element Controller

The variable geometry elements 46 of the engine 10 can be controlled by a variable geometry element controller 50, an example of which is presented in FIG. 3. In many embodiments, it can be considered practical for the variable geometry element controller 50 to be provided in the form of a corresponding one of several modules/functionalities integrated within a centralized engine controller (a specialized form of computer dedicated to engine control) for instance, whereas in other embodiments, it can be preferred to embody the variable geometry element controller 50 as a standalone computer.

In practice, the limited representation of the current operating conditions can be acquired via one or more sensors 36 and made available to the variable geometry element controller 50. The sensors 36 can produce corresponding signals which can be associated to values of measured parameters, a process which may be based on prior calibration in some or all cases. In some cases the measured parameter values 56 can be used directly as monitored parameter values 54 by a scheduling module 58 of the variable geometry element controller 50, whereas in other they can be used to produce synthetic parameters which, in turn, can be used as monitored parameter values 54 by the scheduling module 58. Either one or both measured parameters 56 and synthetic parameters can form a set of monitored parameters 54 which are used by the scheduling module 58 to acquire information about current operating conditions (current values of monitored parameters). Such sensors 36 can include pressure, temperature and torque sensors for instance.

Reasons why information about current operating conditions may be limited include that there are some areas in the engine where it may not be considered feasible to integrate a sensor, and that there are some operating condition parameters for which no sensor may be available in actual conditions of intended use of a gas turbine engine 10. For instance, while such information can be relevant, it may not be feasible to integrate a pressure sensor or a temperature sensor directly within the combustion chamber 14 due to the high temperatures which can be expected there during operation of the engine 10, and in some cases, it may even not be feasible to integrate a sensor immediately downstream of the combustion chamber 14 or subsequently to the first turbine stage(s) for similar reasons. Moreover, there may be no feasible way of directly measuring mass flow W through the main gas path of an aircraft engine outside of controlled testing conditions, such as during flight.

Accordingly, an aim of the variable geometry element controller 50 can be to control the geometrical configuration of the variable geometry element(s) 46 as optimally as possible given i) a discrepancy which can exist between the theoretical optimal operating line 40 which was defined based on the limited data available during engine design and the actual optimal operating line 40 which can be affected by manufacturing tolerances, wear, etc, and ii) the sensor limitations which can exist and which may limit the amount of information about operating conditions made available to the variable geometry element controller 50 during operation of a gas turbine engine 10, especially during flight.

It will be noted that several variations are possible in other embodiments, and that other types of aircraft engines than turboprop engines can have comparable features to those presented above and may thus benefit from the concepts presented below, such as turboshaft engines, turbofan engines, auxiliary power units (APUs), and industrial gas turbine applications.

In turbofan engines, for instance, a fan serves to both pre-compress air within a main gaspath and drive propulsion air in a bypass path surrounding the main gaspath, but one or more compressor stages in the main gaspath may have one or more variable geometry element controlled by a variable geometry element controller.

Optimization of Variable Geometry Element Control

FIG. 3 presents an example variable geometry element controller 50. During operation, in accordance with computer readable instructions 60, the variable geometry element controller 50 can obtain values 56 of one or more measured parameters via sensors 36. As evoked above, such values 56 of measured parameters can be used directly as values of monitored parameters 54, or indirectly, as an element used in determining a value of a synthetic parameter, the latter of which can then be used as a monitored parameter 54. The group of functions associated with determining values of synthetic parameters will be referred to herein as a synthetic value determination module 62 for the sake of simplicity and ease of reference, which can form part of the functions constituting the variable geometry element controller 50. The sensors 36 can include more than one type of sensor (e.g. pressure, temperature, torque), and can be associated to different points along the main gas path and/or to different components of the gas turbine engine (e.g. a torque sensor can be integrated to an engine shaft).

The process or processes of associating values of monitored parameters 54, whether directly measured or synthetic, with values of control parameters 52 of the variable geometry element(s) 46, whether absolute or relative, can be considered to form part of a scheduling module 58 of the variable geometry element controller 50 for ease of later reference, and to be based on control data 48 and on monitored parameter values 54, which can be accessible to the scheduling module 58. The scheduling module 58 can produce control parameter values 52 as an output based on the computer readable instructions 60. The process or processes of controlling the geometrical configuration of the variable geometry element(s) 46 in accordance with the "scheduled" control parameter values 52 can be considered as forming part of a variable geometry control module 64 of the variable geometry element controller 50 for ease of later reference. The variable geometry control module 64 can include tracking subroutines responsible for monitoring, via sensors integrated to one or more variable geometry element, the current geometrical configuration of the variable geometry element 46 and to confirm whether or not the variable geometry element 46 has indeed responded correctly to the control instructions 66.

As reflected in the example presented in FIG. 3, the control of the variable geometry elements 46 can involve the use of control data 48 which may be based on operating lines. The control data 48 can form a basis for matching information acquired about actual operating conditions (values of monitored parameters 54) with corresponding values control parameters 52 associated to corresponding geometrical configurations of the variable geometry element(s). This process of matching can be referred to as scheduling. The control data 48 can be designed in a manner to achieve the best compressor stage efficiency possible in a variety of operating conditions, while respecting safety margins with undesired aerodynamic behaviors such as surge or stall. The control data 48 can be provided by a team of compressor stage designers for instance. As expressed above, the accuracy at which the control data 48 can actually reach the aim can be limited both i) based on the completeness of the data made available to the team of designers, and ii) based on the information acquirable about actual operating conditions during operation of the engine. Both these latter sources of inaccuracy are associated to corresponding layers of safety margins which can be sought to be minimized. Accordingly, one may wish to have as much information as possible about the expected behaviour of the compressor stage in different operating conditions and for different control parameter values, which can be achieved to the extent feasible by testing and simulation, and to have as much information as possible about actual operating conditions in flight, which can be achieved to the extent feasible by the use of sensors 36, in order to allow correlating the sensed operating conditions with the expected behaviour as closely as possible, and thereby minimize safety margins and increase engine performance.

Figure 2:
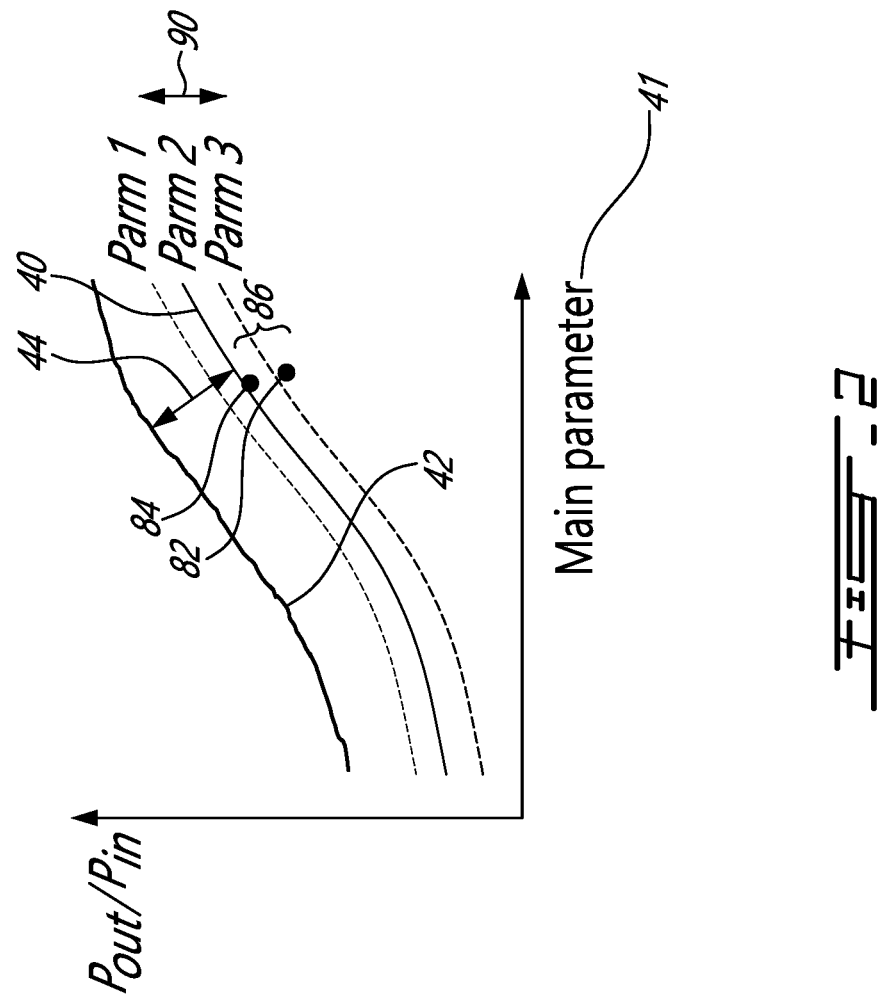
FIG. 2 is a graphical representation of a compressor operating line defined in terms of relationships between variable parameters and aerodynamic behavior references.

The process of producing control data 48 which forms the basis for matching monitored parameter values 54 with control parameter values 52 can involve defining optimal operating points as a function of a number of different parameters, within limits beyond which undesired aerodynamic behavior is considered likely, given layers of safety margin, and can thus be relatively complex. Tools are made available to assist designers in this task. One way to represent the aerodynamic behavior or a compressor stage is to determine a function representing design conditions along which a main parameter should vary relative to a pressure ratio across the compressor. An example of this is represented in FIG. 2 where the main parameter is corrected mass flow 41, and the details of the function can further vary based on real time values of one or more secondary parameters 90 (e.g. altitude, ambient temperature, accessory load, current value of control parameter of one or more variable geometry element). The more closely the main parameter correlates to actual engine performance and conditions of operations, the more accuracy may be reached, and the lower the required safety margin.

Corrected mass flow can be known to represent a potentially highly accurate source of correlation. By "corrected mass flow" what is implied is that the value of mass flow is corrected to factor in effects of pressure and temperature, e.g $W*\sqrt{\theta_{in}}/\delta_{in}$. Corrected mass flow will be referred to herein simply as "mass flow" for simplicity and by convention. Representing the aerodynamic behavior in this way can be convenient since a surge line 42, defined as a value of pressure ratio which varies as a function of mass flow, can be visualized in this manner, and defined within a relatively high degree of accuracy. The surge line 42 can represent a limit operating point beyond which surge can be considered likely to occur. Accordingly, during design, the surge line 42 can be a convenient virtual reference relative to which a operating line 40 (series of operating points varying as a function of one or more monitored parameters) can be defined. The operating line 40 can then be defined in a manner to be spaced apart from the surge line 42 by the safety margin 44.

Given this level of correlation between the monitored parameter of mass flow and such aerodynamic behavior design references, the unavailability of a mass flow measurement during typical operation conditions of an aircraft engine can be inconvenient from the point of view of variable geometry element control.

One approach to address this inconvenience is to use an alternative monitored parameter than mass flow rate as a main monitored parameter for the purpose of variable geometry element control. Alternative monitored parameters can include compressor rotor angular speed (e.g. RPM) and compressor stage power, either of which may be conveniently measurable in flight. However, such alternative monitored parameters may correlate less well to the actual aerodynamic behavior references than mass flow rate, leading to an associated layer of potential imprecision, and, in turn, to an additional, undesired, layer of safety margin.

Another approach to address this inconvenience is to use a synthetic value of mass flow rate W which can be acquired, even during flight, on the basis of measured values of other monitored parameters. Such another approach may allow achieving better precision than the use of an alternative monitored parameter than mass flow rate and thus allow to reduce safety margins and increase engine efficiency in at least some portions of the operating envelope, in some embodiments.

Synthesized Parameter Values

Referring back to FIG. 3, in some cases, a measured value 56 can be used directly as a monitored value 54, whereas in other cases, one or more value of a measured parameter 56 can be used as the basis of determining a value of a synthetic parameter which is then used as a monitored value 54. A given measured value 56 can also be used both directly and as the basis of determining a synthetic value. The process or processes of forming one or more synthetic value based on one or more measured value can be considered to form part of a synthetic value determination module 62 of the variable geometry element controller 50 for ease of reference.

In some cases, a monitored parameter value 54 can be synthesized from one or more other measured parameter values 56, and potentially using one or more other synthesized parameter value, by calculation, i.e. using one or more equation as well as in some cases information about the engine which will collectively be referred to herein as characteristics data 68 for simplicity of reference. Characteristics data 68 can be provided by the designer for instance, and can be based on computer assisted simulation, test results, etc.

A somewhat simple example of a synthesized parameter value can be a synthesized pressure measurement value. Indeed, in a gas turbine engine, if pressure is measured at one point, together with other key measurements, relatively simple equations can lead to pressure at another point of the engine. For example, it can be feasible to either directly measure pressure before or after a compressor stage in an aircraft engine, and to determine the pressure of the other, provided other key measurements are also available. Using such principles, it can be relatively straightforward to synthesize pressure inside the combustion chamber using a measurement of pressure acquired immediately upstream of the combustion chamber and factoring in known pressure losses such as those which can be known to occur across the combustion chamber liner, for instance. Acquiring a synthesized value of mass flow rate in an embodiment can represent a significant level of complexity and can require using an algorithm.

Synthesized Mass Flow Rate

It can be somewhat more elaborated to synthesize mass flow rate within a satisfactory degree of precision. However, due to the principle of mass conservation, if mass flow rate is precisely known at one point along the main gas path, it can be determined precisely at any other point along the main gas path. Accordingly, if mass flow rate can be determined anywhere along the main gas path, it can be determined for the compressor stage in question. Moreover, a normalized flow rate $Q_{HPT}$ in the high-pressure turbine (HPT), of which $Q_{HPT}=W_{HPT}$·

$$\sqrt{T_{HPT}}/P_{HPT},$$

where $W_{HPT}$, $T_{HPT}$ and $P_{HPT}$ are mass flow rate across the high-pressure turbine, temperature and pressure upstream of the high-pressure turbine, respectively, can be a suitably good working approximation in some embodiments. $Q_{HPT}$ can be known to be constant, or can otherwise be determinable within a relatively high degree of accuracy, across a wide range of operating conditions. For instance, in many alternate gas turbine engine embodiments, the inlet side of the high-pressure turbine receives the largest mass flow rate (air+fuel) for its surface area, and when it is choked, which can be true in many portions of the operating envelope it can be responsible for setting the mass flow rate through the main gas path. The value of $Q_{HPT}$, as long as the main gas path is choked, can thus be known from computer assisted simulation and/or engine testing, and can be provided by the design team. With this in mind, a synthesized value of mass flow rate W across a given compressor stage can be acquired and used as a monitored parameter for controlling one or more variable geometry element associated to one or more compressor stage.

To acquire such a synthesized value of mass flow rate W, other synthesized values may need to be acquired. In particular, $T_{HPT}$ may not be measurable. However, temperature at one or more points upstream or downstream of the high-pressure turbine may be measurable, and the amount of power extracted from any intervening turbine stage, or otherwise said the rate of energy extracted from the fluid in between may also be known. For instance, a torque sensor and an angular rotation speed sensor may be used on a spool and power can be determined from the values of torque and angular rotation speed acquired from these sensors. On such basis, for instance, the only missing value to allow synthesizing an estimated value of $T_{HPT}$ may be mass flow rate. $P_{HPT}$, however, may be calculated from pressure measured immediately upstream of the combustor and known pressure drop between the point of pressure measurement and the combustor. The only remaining variable being mass flow rate, W.

While $W_{HPT}$ cannot be practically measured directly on gas turbine engine installed on an aircraft in service during typical conditions of operation, a process can be used to acquire a synthesized value for it. In one embodiment, this process can simultaneously lead to a synthesized value of $T_{HPT}$.

Figure 4:
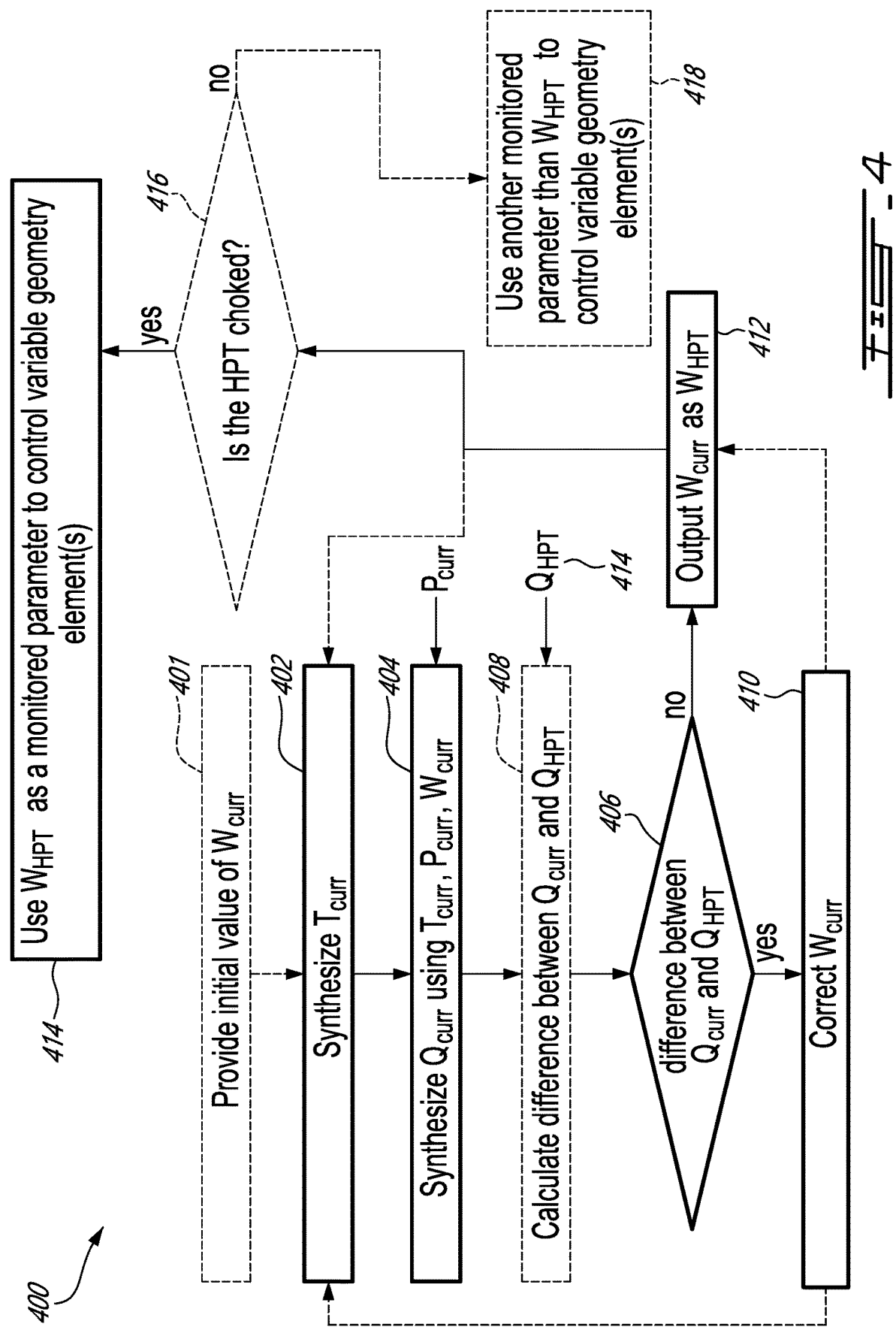
FIG. 4 is a flow chart representing a process of determining a mass flow rate.

An example embodiment of this latter process is represented in the flow chart presented in FIG. 4. The process can change a value of W, referred to instantaneously in the context of the process as $W_{curr}$. For simplicity and clarity, the variable representing W and on which the process operates will be referred to as $W_{curr}$, and will be understood to change over time through an iterative process. The process begins 400 with an initial value of $W_{curr}$ and $T_{curr}$, which can be referred to as guess values. In the embodiment illustrated, the initial values of $T_{curr}$ and $W_{curr}$ are rough estimates based on current conditions as sensed by the available sensors and on the known geometry of the engine/engine behavior, but other embodiments can use alternate ways of generating the initial value of $T_{curr}$ and $W_{curr}$, such as a value known to have previously been determined in similar conditions on the same engine and stored in a computer readable memory for later reference to name one example.

As presented above, the value of $T_{HPT}$ is typically not measurable directly and thus needs to be synthesized as well. One way of synthesizing 402 it is based on the temperature sensed downstream and measured power generated by engine components, amongst various parameters. However, the variable of mass flow rate W, which is a priori unknown, also comes into play in this latter determination. The latter deadlock can be broken by using the current value of mass flow rate, $W_{curr}$, in the synthesis 102 of T, and as the value of T will vary with the value of $W_{curr}$, it can be referred to as $T_{curr}$, until the process has converged. The value of $P_{HPT}$ can be synthesized on the basis of the pressure measured immediately upstream of the combustor, and from known pressure losses which can be determined based on simulation or testing for instance. Since the value of $P_{HPT}$ is likely to change over time, it can also be referred to as $P_{curr}$ in the context of the algorithm, whether it is actualized over subsequent algorithm steps or not. At that point, a current value of normalized mass flow rate $Q_{curr}$ can be synthesized 404 using $W_{curr}$, $T_{curr}$, and $P_{curr}$, using the relationship $W_{curr}$:

$$\sqrt{T_{curr}}/P_{curr} = Q_{curr},$$

for instance.

Before going further, it will be noted that the specific relationship $$Q_{HPT} = W_{HPT} \cdot \sqrt{T_{HPT}}/P_{HPT},$$

is but one example of how Q can be defined, and can represent the relationship with the most significant variables. In other embodiments, it may be preferred to use more elaborated relationships, which can cater for other effects at play such as variations of gas properties with temperature and tip clearance effects. In one example, the relationship $$Q_{HPT} = \frac{W \ast \sqrt{(T1 \ast R)}}{DI^2 \ast P1 \ast \sqrt{(\gamma)}}$$

can be used, for instance, where $\gamma$ can be a function of temperature. Such relationships, even if implementing additional corrections, will be considered as being based on the relationship $$Q_{HPT} = W_{HPT} \cdot \sqrt{T_{HPT}}/P_{HPT}$$

in the context of this specification.

As evoked above, in conditions where the high-pressure turbine is choked, $Q_{HPT}$ can be accurately predicted independently of variations $W_{HPT}$, $T_{HPT}$, and $P_{HPT}$, and acquirable for a given engine within a relatively high degree of precision based on simulation or testing, and storable within computer readable memory. Given potential expectable inaccuracy in determining the initial value of $W_{curr}$, after the first sequence, the determined value of $Q_{curr}$ can be expected to be different from $Q_{HPT}$. This difference provides an indication that W not a correct value of W. The difference between $Q_{curr}$ and $Q_{HPT}$ can be established 408 directly by comparing $Q_{curr}$ and $Q_{HPT}$, or indirectly, such as by calculating a value of $W_{HPT}$ based on the relationship $W_{HPT}$.

$$\sqrt{T_{curr}}/P_{curr} = Q_{HPT},$$

and comparing the value of $W_{HPT}$ with the value of $W_{curr}$. The latter method can lead to determining 406 that the difference between $Q_{curr}$ and $Q_{HPT}$ is below a threshold value as well. However, the first method may be preferred for simplicity. If the determined difference between $Q_{HPT}$ and $Q_{curr}$ is low, such as if it is below the expected accuracy in the determination of $Q_{HPT}$ or any other threshold value considered suitable for the intended purpose, $W_{curr}$ can be considered to correspond to $W_{HPT}$, and $W_{curr}$ can be outputted 412 as such, however, this is likely to not be the case after the first sequence.

In one embodiment, the difference between $Q_{curr}$ and $Q_{HPT}$ is determined 408 and characterized in terms of amplitude and sign (positive or negative). Interestingly, not only does the fact that the difference between $Q_{HPT}$ and $Q_{curr}$ exceed the threshold value represent an indication that $W_{curr}$ does not correspond to the actual value of $W_{HPT}$ (and simultaneously that $T_{curr}$ does not correspond to the actual value of $T_{HPT}$), but the ratio between $Q_{HPT}$ and $Q_{curr}$ can be an indication of the ratio between $W_{curr}$ and $W_{HPT}$. Accordingly, the ratio between $Q_{HPT}$ and $Q_{curr}$ can be used in imparting a correction 410 to the value of $W_{curr}$ to produce a new value of $W_{curr}$ likely to be closer to the actual value of $W_{HPT}$. In one embodiment, correcting 410 $W_{curr}$ can be based directly on the ratio between $Q_{HPT}$ and $Q_{curr}$, such as by changing $W_{curr}$ directly and proportionally to the ratio between $Q_{HPT}$ and $Q_{curr}$, whereas in another embodiment, correcting 410 $W_{curr}$ can be based indirectly on the ratio between $Q_{HPT}$ and $Q_{curr}$, such as by factoring in a proportionality value and/or one or more additional variables in accordance with one or more equations as per calibration, simulation or testing for instance. The way in which $W_{curr}$ is modified based on the ratio between $Q_{HPT}$ and $Q_{curr}$ can be based on simulation or testing, for instance. Depending on how $W_{curr}$ is corrected, in some embodiments, the corrected value of $W_{curr}$ may be useable as is, and considered a satisfactory approximation of $W_{HPT}$, and may thus be outputted 412 as such. In other embodiments, the corrected value of $W_{curr}$ may not be considered to be a satisfactory approximation of $W_{HPT}$ at this time, or may not be considered to be a satisfactory approximation with a sufficiently high degree of certitude, and greater precision may be sought.

In the latter case, the corrected value of $W_{curr}$ can be used to synthesize 402 a corrected value of $T_{curr}$, and both these values can then be used to synthesize 404 a new value of $Q_{curr}$. In other words, another iteration of the first sequence of steps can be performed, and the algorithm can be said to "return" to the step of determining 406 whether a difference between $Q_{curr}$ and $Q_{HPT}$ exists/exceeds the threshold value. At this point, determining that the difference is below the threshold value may lead to outputting 412 $W_{curr}$ as a monitored parameter value of W directly. Alternately, such as if the difference is determined to be greater than the threshold value, a further correction can be made 410 to $W_{curr}$, which can be based on the amplitude and sign of the difference, after which $W_{curr}$ can be outputted 412 as a value of W, or the algorithm can return to the step of synthesizing 402, 404 a new $Q_{curr}$ and thereby perform another iteration. In some embodiments, many iterations will be necessary for the difference between $Q_{curr}$ and $Q_{HPT}$ to be below the threshold value, and these iterations can be performed quickly enough for the resulting value of $W_{curr}$ to be satisfactorily useable 414 as a monitored parameter value by the scheduling module to determine control parameter values used in the control of the geometrical configuration of one or more variable geometry element(s). In practice, the mass flow rate along gas path remains constant based on conservation of mass, and the acquired value of $W_{HPT}$ can be used to determine the mass flow rate through a compressor stage, and thereby be used as a monitored parameter to control a variable geometry element of that compressor stage.

At least in some embodiments, using control data 48 in which one or more values of mass flow rate W synthesized as presented above are used to establish a correlation with desired control parameter values 52 of geometrical configurations of the variable geometry elements can allow a higher degree of correlation, and thus of precision, than using instead a value of a directly measurable parameter such as compressor rotation speed, or even another synthesizable value such as compressor power, to establish the basis of the correlation, thereby allowing a gain in terms of reducing safety margin.

In some embodiments, the synthesized value of $W_{HPT}$ will be used 414 as a monitored parameter value to control the geometrical configuration of the variable geometry elements only when the high-pressure turbine has first been determined 416 to be in a choked condition, and alternately, if the high-pressure turbine is not in a choked condition, the value of a monitored parameter other than $W_{HPT}$ will be used 418 instead, such as rotor angular speed for instance.

FIG. 5 presents an example synthetic value determination module 62 which can include functions associated with determining a synthetic value of $W_{HPT}$ in accordance with an embodiment. The synthetic value determination module 62 can include a high-pressure turbine temperature estimator 70 used to acquire a synthetic value of high-pressure turbine temperature $T_{curr}$, a high-pressure turbine mass flow rate estimator 72 used to determine a synthetic value $W_{curr}$, a high-pressure turbine pressure determiner 74 used to determine a synthetic value of high-pressure turbine pressure $P_{curr}$, a normalized mass flow rate calculator 76 used to determine a result value of normalized mass flow rate mass flow rate $Q_{result}$, and a normalized mass flow rate comparator 78 which can be used to determine a ratio between the result value $Q_{curr}$ and the design value $Q_{HPT}$ of normalized mass flow rate. The synthetic value determination module 62 can further include a function to perform an iterative process based on varying potential values of $W_{curr}$ until a match is found between the resulting normalized value $Q_{curr}$, and the corresponding design value $Q_{HPT}$, at which point the latest value of mass flow rate $W_{curr}$ can be considered to be correct and outputted in the form of a synthetic mass flow rate value for use as an input in the scheduling module 58.

The high pressure turbine is the turbine closest to the combustor, in the main gaspath. In an engine having a single turbine stage, the single turbine stage is considered the high pressure turbine from the point of view of this specification.

Control Methods

It will be noted that different processes can be performed by a variable geometry element controller 50 to control the control parameters of the variable geometry element(s) 46 based on the monitored parameter values 54. Generally, some of such processes can be classified into two different approach types: absolute value control and relative value control. FIG. 6 presents an example of an absolute value control scheme whereas FIG. 7 presents an example of a relative value control scheme. These examples will now be detailed for the purpose of exploring different avenues.

Figure 6B:
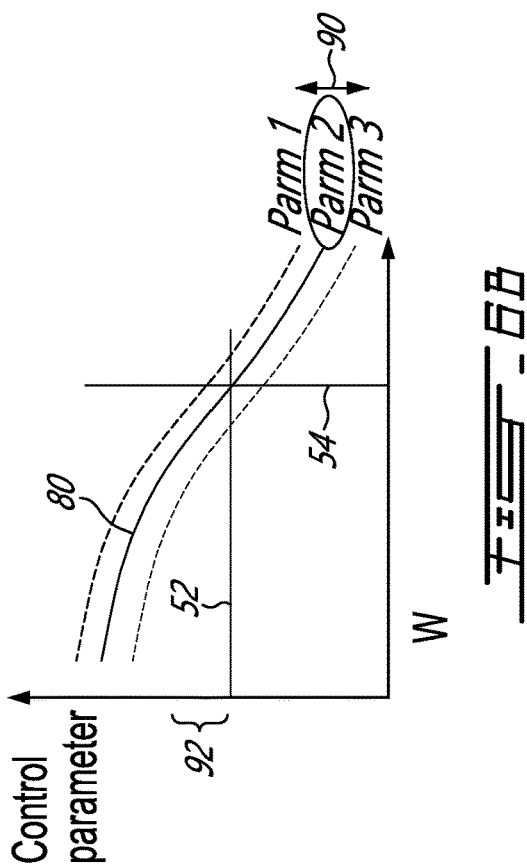
FIG. 6A is a flow chart representing a control method in accordance with an absolute value control scheme, with 6B being a graphical representation thereof.
Figure 6A:
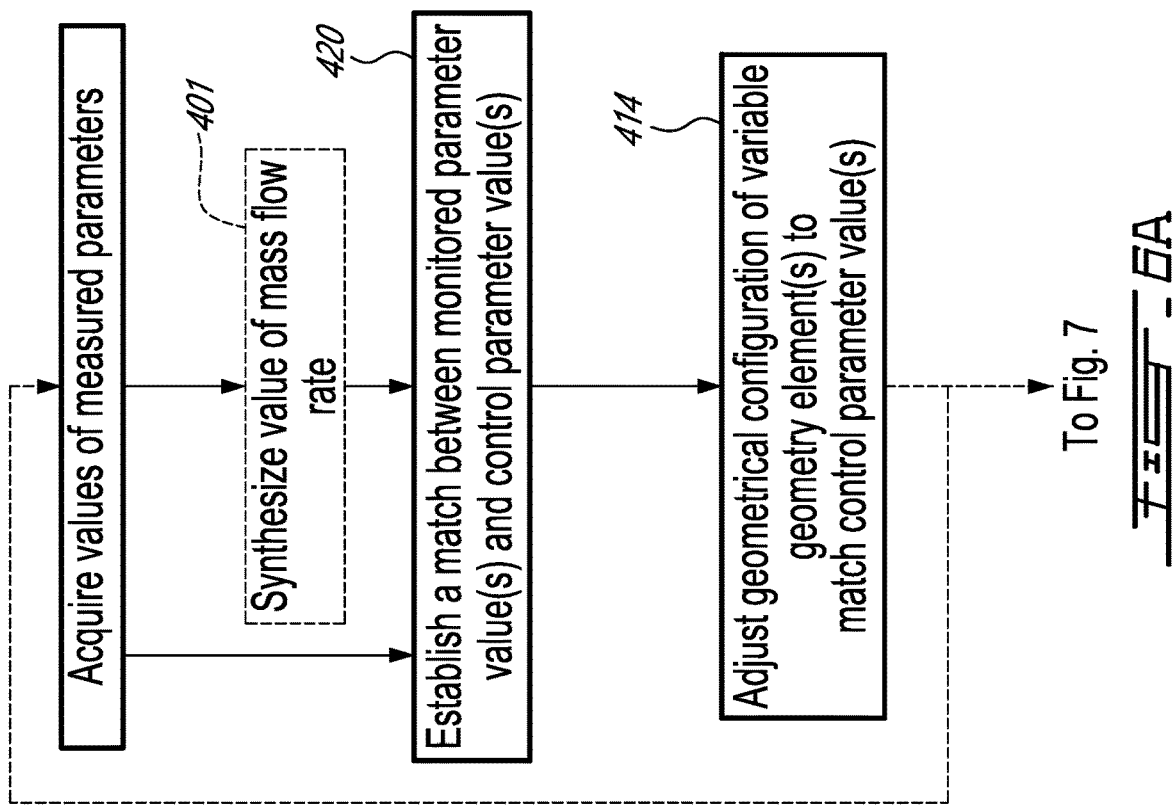

Referring to FIGS. 6A and 6B, the absolute value control scheme can be based on establishing 420 a match between a specific value of one or more monitored parameter 54, 90 and a specific value of one or more control parameter 52 on the basis of relationships 80 such as functions or tables (an example of which is graphically represented in FIG. 6B). The relationships 80, which are stored in computer readable memory in the form of control data 48, can be defined by the design team, based on simulation and/or testing. For instance, based on simulation and/or testing, the design team may determine which value of one or more control parameter 52, such as variable guide vane angle or bleed valve opening % for instance, are expected to produce an operating point corresponding to a given operating line 84 (an example of which is graphically represented in FIG. 7B), for a given combination of values of monitored parameters 54, including a main parameter (here W) and potentially several other parameters. In the absolute value control scheme, it is this value or values of the one or more control parameters 52 which are associated directly to values of other monitored parameters 54 by the control data 48, and the variable geometry control module 64 (FIG. 2) can then simply control 414 the variable geometry element(s) 56 to achieve the determined value(s) of the control parameters.

The absolute value control scheme is not based on the use feedback as to whether or not, in the actual engine in its current state of operation, setting the control parameters to the determined values did indeed produce the intended operating point or not. Accordingly, and with reference back to FIG. 2, any discrepancy between the expected (e.g. design) relationship 80 and the actual relationship will produce a difference 86 between the actual operating point 82 and the intended operating point 84. This is not ideal, but the resulting degree of inaccuracy can satisfactorily be compensated by setting associated safety margins 44 in some embodiments.

Referring to FIGS. 7A and 7B, the relative value control scheme can include a step of determining 422 a difference 86 between an actual operating point 82 and a desired operating point 84 on a operating line 88. The scheme can be based on establishing 424 a match between i) a relative difference 86 between an actual operating point and a operating line and ii) a corresponding value of a difference between a current value of one or more control parameter 52 and a new value of one or more control parameter 52 expected to bring the operating point 82 closer to a operating line point (desired operating point) 84 in accordance with control data 48. These matches can be performed on the basis of relationships 88 such as functions or tables, and the relationships 88 can further factor in additional monitored parameters 90. The relationships 88, which can be stored in computer readable memory in the form of control data 48 accessible to the scheduling module 58, can be defined by the design team, based on simulation and/or testing. For instance, based on simulation and/or testing, the design team may determine which difference 92 (FIG. 6B) in values of one or more control parameter 52, such as variable blade angle α or bleed valve opening % for instance, are expected to produce which changes 86 to the operating point, in a given combination of values of monitored parameters 54, 90. In the relative value control scheme, it is these differences 92 in values of the one or more control parameters 52, by contradistinction with the absolute, target values used in the absolute value control scheme, which are associated the differences in other monitored parameters 54 associated to the operating point 82 and operating line 88 by the control data 48, as opposed to absolute values, and the variable geometry control module 64 (FIG. 2) can then simply perform 414 the determined changes in the variable geometry element(s) to bridge the gap 86 between sensed and desired monitored parameters.

The relative value control scheme uses feedback based on resulting operating points 82 as acquired 426 on the monitored parameters, and because of this, it has the potential to iterate and converge onto the intended operating line 88 independently of any inaccuracy which may exist between the expected relationship 80 between control parameters and monitored parameters, and the actual relationship 88 between monitored parameters 54, 90 and operating points 82, 84. This may allow to reduce the safety margin requirements to maintain an equivalent level of safety in some embodiments.

On the other hand, however, the relative value control scheme provides a significant degree of authority to the variable geometry controller 50, which may lead to behaviors other than the intended design behaviours. To this end, in some embodiments, it can be desired to limit the level of authority of the variable geometry controller 50 by imposing 428 a limit, or threshold, to the allowable extent of change in the values of the control parameters 52. This limit can be on a per iteration basis, for example. Accordingly, if the change in the values of the control parameters 52 determined by the relative value control scheme is determined 428 to exceed a given change threshold, the control parameter values can be set (limited) to the change threshold, and the control of the variable geometry element 46 can be performed in accordance with the limited control parameter value, instead of being based on the greater change value initially determined.

In an embodiment, the processes of FIG. 6 and of FIG. 7 can be combined, with the process of FIG. 6 being used to set initial values of the control parameters in a manner to generate an actual operating point 82 which is close to the design operating point 84, and the process of FIG. 7 can be used subsequently, and potentially iteratively, to determine a gap 86 between the actual operating point 82 resulting from the process of FIG. 6 and the designed operating line 88, and change 414 the value(s) of the control parameter(s) in a manner to close the gap 86.

Detailed Example Embodiment

A detailed example embodiment will now be described using a context where gas turbine engine 100 has a set of sensors as indicated on FIG. 8. More specifically, A VIGV/VGV control scheme can be provided that targets a compressor operating line (pressure ratio vs flow) using a way of calculating the compressor flow and inter-stage pressure and temperature in service. Proposed logic to control low spool variable geometry (VIGV) on a constant operating line is presented in FIG. 9, whereas proposed logic to control high spool variable geometry VGV on a constant operating line is presented in FIG. 10.

Figure 10:
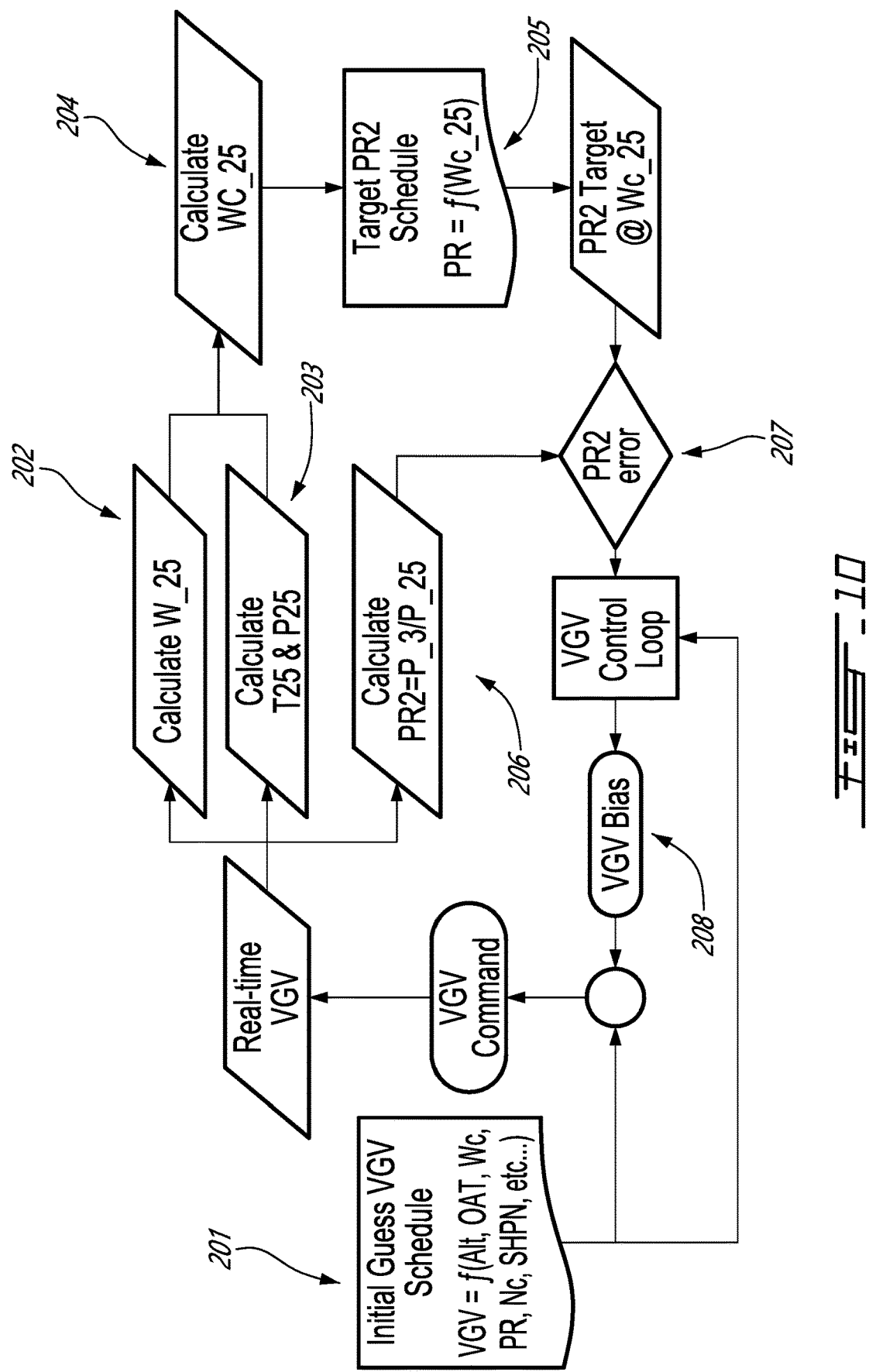
FIG. 10 is a graphical representation of logic to control a high spool compressor variable guide vane geometry on a constant operating line, in accordance with an embodiment.

1. With reference to FIGS. 9 and 10:
   a) Initial VIGV/VGV values are computed at steps 101 & 201. Typical Initial Guess VIGV/VGV schedules are shown in FIG. 6B in which the various schedules can be function of Parm 1, Parm 2, Parm 3, etc. . . . where Parm 1 . . . N can be Altitude, Ambient Temperature, Accessory Load, Bleed, etc . . . ;
   b) The compressor massflow is computed at steps 102 & 202 from the algorithm depicted in FIG. 11 (described below);
   c) At step 103, measurements of low-spool compressor inlet pressure and temperature are obtained;
   d) At step 203, the Inter-Compressor Temperature (T25) and Pressure (T25) are calculated from the algorithm depicted in FIG. 12. Note: T25 and P25 could also come from engine sensors if available but here they are synthesized from other engine sensors;
   e) At steps 104 & 204, a compressor inlet corrected flow is calculated as $W*\sqrt{(T/Tref)}/(P/Pref)$ from the massflow, pressures and temperatures obtained from 1b to 1d above;
   f) At steps 105 & 205, the target Pressure Ratio at the massflow calculated in 1e above is obtained. Typical Pressure Ratio vs Massflow schedules are shown in FIG. 7B in which the various schedules can be function of Parm 1, Parm 2, Parm 3, etc. . . . where Parm 1 . . . N can be Altitude, Ambient Temperature, Accessory Load, Bleed, etc . . . ;
   g) At step 106, the low spool compressor pressure ratio is calculated using values from 1c and 1d above;
   h) At step 206, the compressor discharge pressure (P3) measurement is obtained and the high spool compressor pressure ratio is calculated based on P3 and 1d above;
   i) At steps 107 & 207, the actual pressure ratio is compared to the target pressure ratio from 1f above;
   j) At steps 108 & 208, a bias is applied to the Initial Guess VIGV/VGV schedules in order to achieve the target pressure ratio. Note that the bias can be directed to stay within the allowed range/authority given to the software; and
   k) Steps 101/201 to 108/208 are repeated until convergence (i.e. PR error becomes suitably close to 0, or considered negligible, which can be achieved by comparing to a given threshold or by the sensitivity of the measurement instruments, in one example, the PR error can be considered to be zero when it is below 0.1% for instance)

Figure 11:
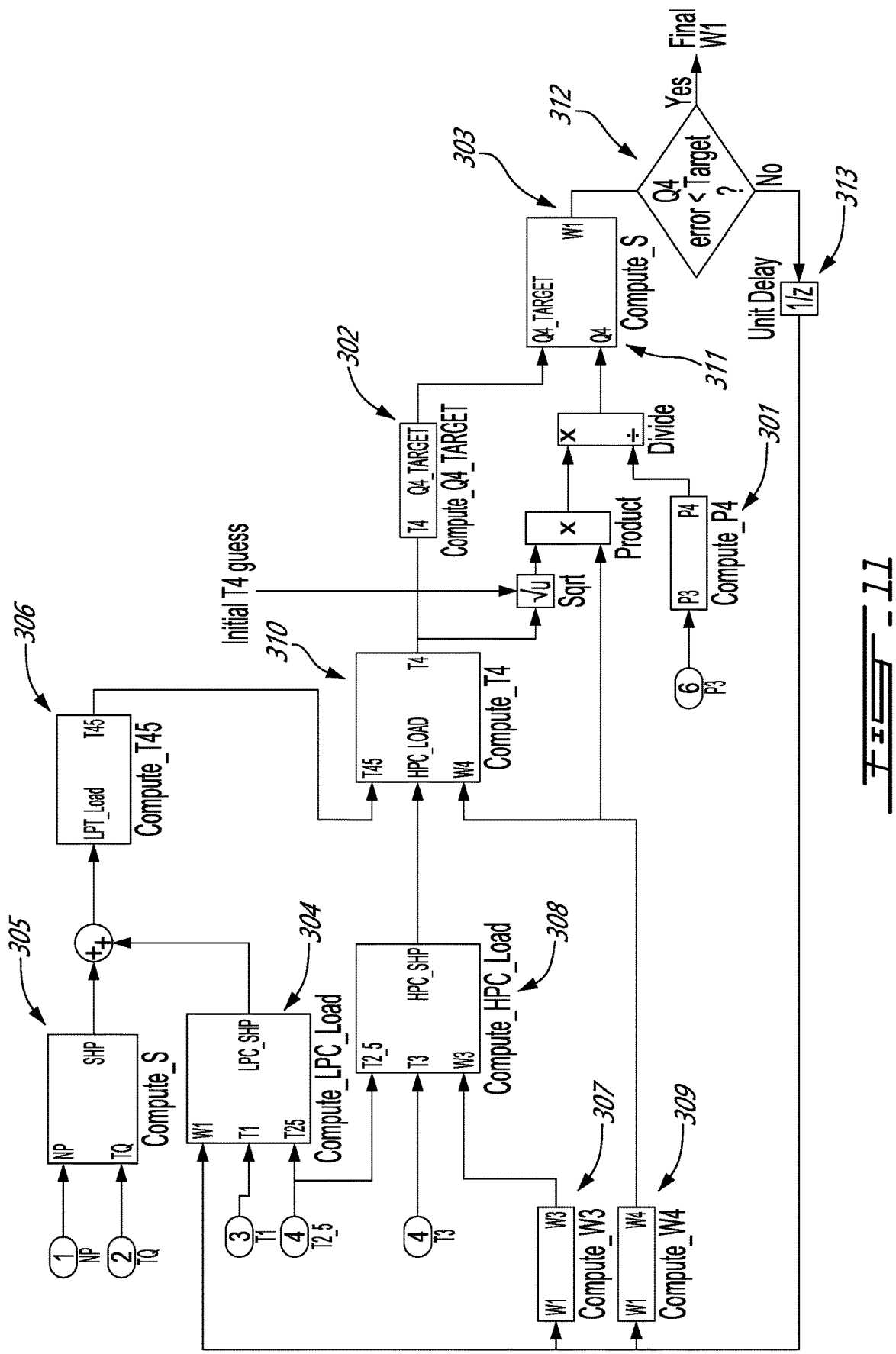
FIG. 11 is an algorithm to compute compressor inlet massflow in accordance with an embodiment.
Figure 12:
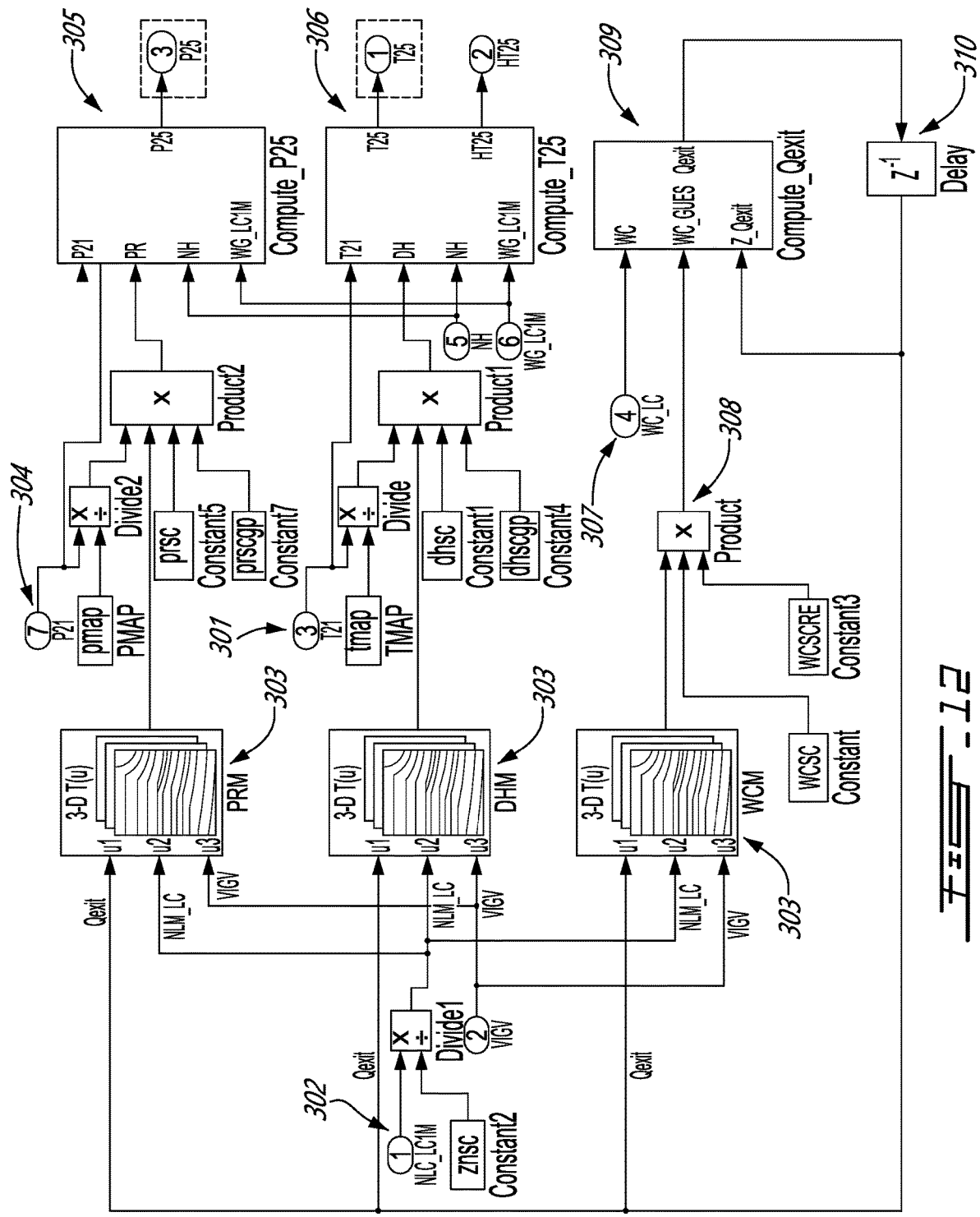
FIG. 12 is an algorithm to compute inter-compressor pressure and temperature, in accordance with an embodiment.

2. With reference to FIG. 11, an example algorithm to compute W1 can be as follows:
   a) Initial Guess T4 and W1 from current flight condition and engine power level;
   b) At step 301, compute P4 from P3 measurement;
   c) At step 302, compute Q4_Target from High-Pressure (HP) Turbine vane characteristic. If vane is choked, Q4 is almost constant;
   d) From Q4_Target, P4 and T4, compute W4 (flow at HT vane);
   e) At step 303, compute W1 (compressor inlet flow) based on W4;
   f) At step 304, compute the low-pressure compressor load (LPC_SHP) from W1 and engine measurements and/or synthesized parameters;

g) At step 305, compute engine output shaft power (SHP) from output shaft speed (NP) and torque (TQ);

h) At step 306, compute the low-pressure turbine load (LPT_Load) from engine power (SHP), low-pressure compressor load (LPC_SHP) and engine parasitic assumptions; and from EGT (T6) temperature measurement and LPT_load, compute T45;

i) At step 307, compute the compressor exit flow (W3) from compressor inlet flow (W1);

j) At step 308, compute the High Pressure Spool load (HPC_SHP) from W3 and engine measurements and/or synthesized parameters;

k) At step 309, Compute W4 (flow at HT vane) from W1;

l) At step 310, compute the HP load from compressor load and from HPC_Load, W4 and T45, compute T4;

m) At step 311, compute Q4 from W4, T4 and P4;

n) At step 312, quantify Q4 error (Q4 vs Q4_target);

o) At step 313, apply correction to W1 based on Q4 error; and p) Loop until convergence and output final W1.

3. Now with reference to FIG. 12 an algorithm to compute the inter-compressor pressure and temperature (P25 and T25) can work as follows:

a) Initial Guess Qexit from current flight condition and engine power level;

b) At step 301, compute low-spool inlet temperature (T21) from engine inlet temperature measurement (T1) and compressor charge heating/air system assumptions;

c) At step 302, compute low spool normalized speed (NLM_LC) from speed sensor (NL) and T2;

d) At step 303, obtain normalized low-spool compressor flow (WCM), delta enthalpy (DHM) and pressure ratio (PRM) from compressor characteristics using Qexit, low-spool normalized speed (NLM_LC) and VIGV position;

e) At step 304, compute low-spool inlet pressure (P21) from engine inlet pressure measurement (P1) and compressor inlet loss assumptions;

f) From low-spool compressor normalized flow (WCM), inlet temperature (T21) and pressure (P21), obtain low-spool compressor mechanical flow (WG_LC1M);

g) At step 305, obtain low-spool compressor exit pressure (P25) from inlet pressure (P21), pressure ratio (PR), low-spool mechanical flow (WG_LC1M) and high-spool mechanical speed (NH);

h) At step 306, obtain low-spool compressor exit temperature (T25) from inlet temperature (T21), delta enthalpy (DH), low-spool mechanical flow (WG_LC1M) and high-spool mechanical speed (NH);

i) At step 307, obtain low-spool compressor inlet corrected flow from T21, P21 (see step 301 & 304) and W1 (see W1 algo in 2) above);

j) At step 309, obtain guess low-spool compressor inlet corrected flow (WC_GUES) from WCM, T21 & P21;

k) At step 309, quantify WC error (WC vs WC_GUES) and obtain Qexit;

l) At step 310, apply correction to Qexit based on WC error;

m) Loop until convergence and output final P25 & T25.

Using the example embodiment presented above, the compressors (low spool and high spool) can always operate on the same operating line which can make the engine less sensitive to deterioration effects. Surge margin benefits can also occur since items related to deterioration can be removed or significantly reduced in surge margin audit (SMA) requirements. It will be noted that in the embodiment presented, engine measurements in service are limited, hence why the proposed inventions includes algorithms to synthesized various parameters generally unavailable in service. However, it should be understood that if those corresponding parameters are measured, measurements could be used (and may be more accurate than using synthesized parameters, depending on sensors accuracies).

Figure 13:
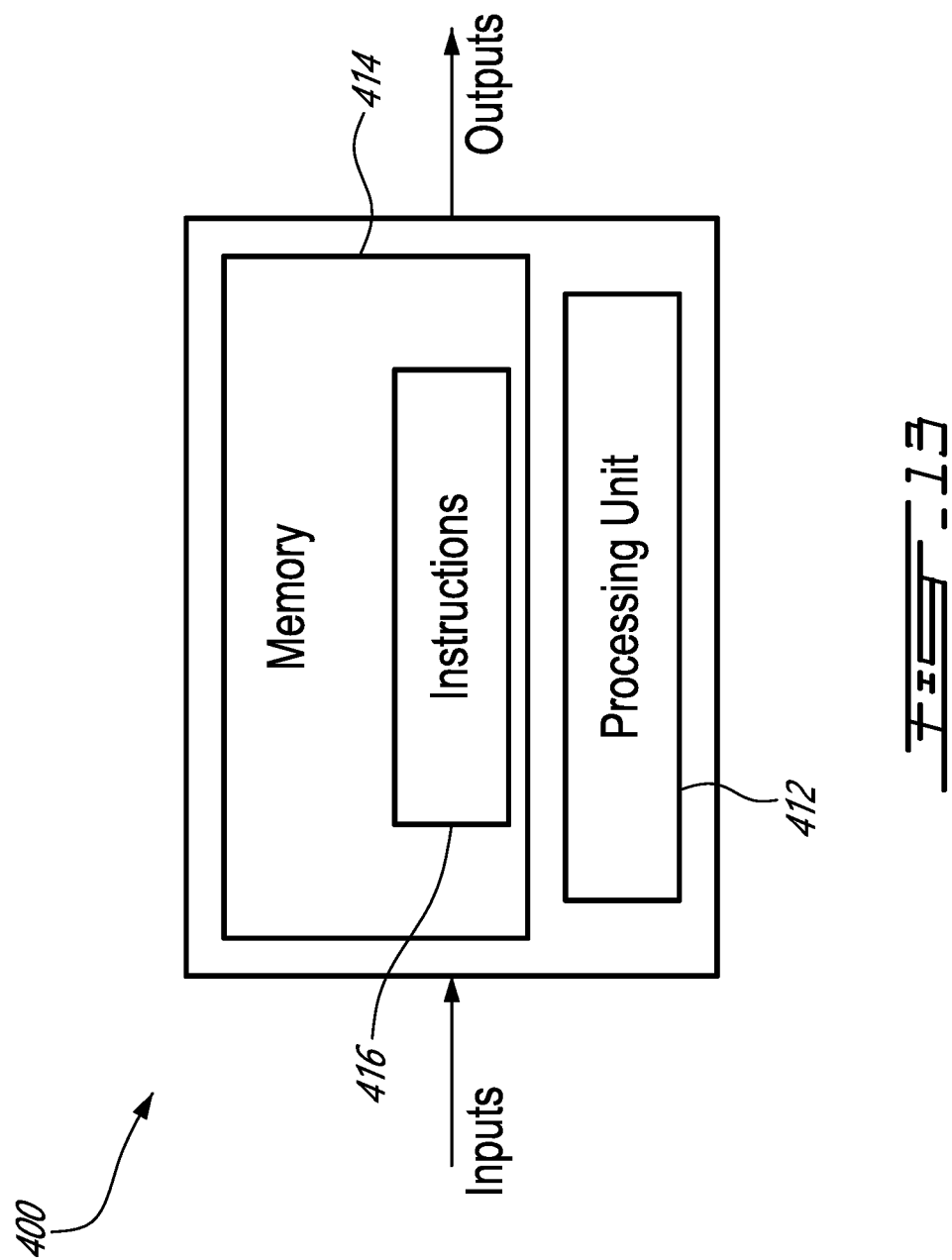
FIG. 13 is a block diagram of a computer, in accordance with an embodiment.

Referring to FIG. 13, it will be understood that the expression "computer" 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of controlling the geometrical configuration of a variable geometry element of a compressor stage of a gas turbine engine, the method comprising:

determining a mass flow rate W of working fluid circulating through the compressor stage, including determining whether a difference between an expected value of normalized mass flow rate $Q_{HPT}$ through a high-pressure turbine of the gas turbine engine and an actual value of normalized mass flow rate $Q_{curr}$ through the high-pressure turbine exceeds a threshold value, wherein the actual value of normalized mass flow rate $Q_{curr}$ a function of a current value of mass flow rate $W_{curr}$, a current value of pressure $P_{curr}$, and a current value of temperature $T_{curr}$ through the high-pressure turbine based on the relationship $$W_{curr} \cdot \sqrt{T_{curr}}/P_{curr} = Q_{curr};$$

when the difference exceeds the threshold value, correcting the value of $W_{curr}$; and outputting the value of $W_{curr}$ as a determined value of mass flow rate W;

determining a control parameter value associated to the geometrical configuration of the variable geometry element based on the determined value of mass flow rate W; and changing the geometrical configuration of the variable geometry element in accordance with the determined control parameter value.

2. The method of claim 1 further comprising returning to the step of determining whether the difference exceeds the threshold value on the basis of the corrected value of $W_{curr}$ wherein said outputting the value of $W_{curr}$ is contingent upon said difference not exceeding the threshold value.

3. The method of claim 1 wherein said determining whether the difference exceeds the threshold value includes determining the ratio between $Q_{HPT}$ and $Q_{curr}$, wherein said correcting the value of $W_{curr}$ is based on the ratio between $Q_{HPT}$ and $Q_{curr}$.

4. The method of claim 1 performed while the gas turbine engine is in operation on an aircraft.

5. The method of claim 1 wherein the variable geometry element is a set of variable guide vanes, and the change in the geometrical configuration corresponds to a change in the angle of attack of the variable guide vanes.

6. The method of claim 1 wherein the variable geometry element is a bleed valve and the change in the geometrical configuration corresponds to a change in the % of opening of the bleed valve.

7. The method of claim 1 wherein the control parameter value is a first control parameter value associated to the geometrical configuration of a first variable geometry element, further comprising determining a second control parameter value associated to the geometrical configuration of a second variable geometry element based on the determined value of mass flow rate W, further comprising changing the geometrical configuration of the second variable geometry element based on the second determined control parameter value.

8. The method of claim 1 further comprising determining whether the high-pressure turbine of the gas turbine engine is operating in a choked condition, wherein said determining the control parameter value based on the determined value of mass flow rate W is contingent upon a determination that the high-pressure turbine of the gas turbine engine is operating in the choked condition.

9. The method of claim 1 wherein said determining the control parameter value includes establishing a match between the determined value of mass flow rate W and the control parameter value.

10. The method of claim 9 wherein said changing the geometrical configuration of the variable geometry element includes setting a geometrical configuration of the variable geometry element in a manner to correspond to the control parameter value.

11. The method of claim 9 wherein said establishing a match includes establishing a match between values of a plurality of monitored parameters including the determined value of mass flow rate W and the control parameter value.

12. The method of claim 1 further comprising determining an operating point of the gas turbine engine based on current values of a plurality of monitored parameters, determining a difference between the operating point of the gas turbine engine and a operating line point, wherein the control parameter value corresponds to a requested value of change in the geometrical configuration of the variable geometry element, said requested value of change being associated with the difference between the current operating point and the operating line point, wherein said changing the geometrical configuration of the variable geometry element is performed in accordance with the requested value of change.

13. The method of claim 12 wherein the plurality of monitored parameters include the determined value of mass flow rate W.

14. The method of claim 12 further comprising repeating the steps of determining the mass flow rate, determining the current operating point, determining the control parameter value, and said changing the geometrical configuration wherein said changing the geometrical configuration is contingent upon said difference between the current operating point and the operating line point exceeding an operating line threshold value.

15. The method of claim 12 further comprising, prior to said changing the geometrical configuration, comparing the requested value of change to a change threshold value, and setting the requested value of change to the change threshold value contingent upon said compared requested value of change exceeding the change threshold value.

16. The method of claim 1 performed on both a first variable geometry element of a first compressor stage of the gas turbine engine, and on a second variable geometry element of a second compressor stage of the gas turbine engine, during real-time operation of the gas turbine engine.

17. The method of claim 1 wherein said determining whether the difference exceeds the threshold value includes determining $P_{curr}$ based on a measured value of pressure taken upstream of the combustor and a known pressure loss, further comprising measuring values of temperature and pressure downstream of the combustor, engine output torque and determining $T_{curr}$ based on a known relationship between power, torque, mass flow rate, temperature difference and pressure difference, using the current value of mass flow rate $W_{curr}$.

18. The method of claim 1 wherein said determining whether the difference exceeds the threshold value includes calculating $Q_{curr}$ using the equation $$W_{curr} \cdot \sqrt{T_{curr}}/P_{curr} = Q_{curr}$$

and determining the difference between $Q_{curr}$ and $Q_{HPT}$.

* * * * *